United States Patent [19]

Bindell et al.

[11] Patent Number: 4,948,407
[45] Date of Patent: Aug. 14, 1990

[54] PROTON EXCHANGE METHOD OF FORMING WAVEGUIDES IN LINBO3

[75] Inventors: Jeffrey B. Bindell, South Whitehall Township, Lehigh County; James T. Cargo, Bethlehem; Ronald J. Holmes, Greenwich Township, Berks County; Michael C. Hughes, Lehigh Township, Northampton County, all of Pa.

[73] Assignee: AT&T Bell Laboratories, Murray Hill, N.J.

[21] Appl. No.: 443,808

[22] Filed: Nov. 29, 1989

Related U.S. Application Data

[63] Continuation-in-part of Ser. No. 189,914, May 3, 1988, abandoned.

[51] Int. Cl.[5] .................. H01L 21/306; C03C 4/10
[52] U.S. Cl. ........................ 65/3.14; 65/3.11; 65/30.1; 156/656; 156/659.1; 350/96.12; 350/96.34
[58] Field of Search ............. 65/3.14, 3.11, 30.1; 156/656, 695.1; 350/96.12, 96.34

[56] References Cited

U.S. PATENT DOCUMENTS

| | | | |
|---|---|---|---|
| 4,284,663 | 8/1981 | Carruthers | 427/164 |
| 4,400,052 | 8/1983 | Alferness et al. | 65/30.13 X |
| 4,547,262 | 10/1985 | Spillman, Jr. | 156/659 |
| 4,781,743 | 11/1988 | Holmes et al. | 65/30.13 |

OTHER PUBLICATIONS

Proton exchange for high-index waveguides in LiNbO3, J. L. Jackel, C. E. Rice, and J. J. Veselka, Appl. Phys. Lett., vol. 41, No. 7, Oct. 1, 1982.

Independent control of index and profiles in proton-exchanged lithium niobate guides, M. De Micheli, J. Botineau, S. Neveu, P. Sibillot, and D. B. Ostrowsky, Optics Letters, vol. 8, No. 2, Feb. 1983.

Optical waveguides in LiTaO3 formed by proton exchange, W. B. Spillman, Jr., N. A. Sanford, and R. A. Soref, Optics Letters, vol. 8, No. 9, Sep. 1983.

Characterization of proton-exchange slab optical waveguides in z-cut LiNbO3, D. F. Clark, A. C. G. Nutt, K. K. Wong, P. J. R. Laybourn and R. M. DeLaRue, J. Appl. Phys. 54(11), Nov. 1983.

Secondary-ion mass spectroscopy characterization of proton-exchanged LiNbO3 waveguides, N. A. Sanford and W. C. Robinson, Optics Letters, vol. 10, No. 4, Apr. 1985.

Structural characterization of proton exchanged LiNbO3 optical waveguides, C. Canali, A. Carnera, G. Della Mea, P. Mazzoldi S. M. Al Shukri, A. C. G. Nutt and R. M. De La Rue, J. Appl. Phys, 59 (8), Apr. 15, 1986.

Proton-exchanged, lithium niobate planar-optical waveguides: Chemical and optical properties and room-temperature hydrogen isotopic exchange reactions, A. Loni and R. M. DeLaRue, J. M. Winfield, J. Appl. Phys. 61(1), Jan. 1, 1987.

Primary Examiner—Robert L. Lindsay
Attorney, Agent, or Firm—Wendy W. Koba

[57] ABSTRACT

A proton-exchange method of forming optical waveguides within a lithium-based optical substrate is disclosed which utilizes sulfuric acid as the proton source. The substrate is masked to expose the areas desired to be transformed into waveguiding regions and immersed in a heated sulfuric acid bath for a period of time sufficient to provide the exchange between the protons in the acid and the lithium in the substrate. The presence of the protons in the substrate results in increasing the extraordinary refractive index $\Delta n_e$ in the unmasked area so that optical guiding may be accomplished. Upon removal of the substrate from the sulfuric acid bath, the substrate must be annealed so as to drive the protons to a depth sufficient to provide effective guiding.

7 Claims, 3 Drawing Sheets

UNTREATED SUBSTRATE

PROTON-EXCHANGED SUBSTRATE
(USING $H_2SO_4$)

PROTON EXCHANGE METHOD OF FORMING WAVEGUIDES IN LINBO₃

This application is a continuation-in-part of application Ser. No. 189,914, filed on May 3, 1988 now abandoned.

BACKGROUND OF THE INVENTION

1. Field of the Invention

The present invention relates to a proton-exchange method of forming optical waveguides and, more particularly, to such a method which utilizes sulfuric acid as the proton donor source.

2. Description of the Prior Art

The ability to form light-guiding structures in optically transparent substrates is considered to be a critical requirement for most optically-based communication systems, where lithium niobate or lithium tantalate is often utilized as the optically transparent substrate material of choice. One conventional method of forming such waveguides is to diffuse metal (titanium, for example) into the surface of the substrate. The in-diffused metal will increase the index of refraction of the substrate in the affected region such that any light signal propagating through the substrate will be forced to travel through the waveguiding region. U.S. Pat. No. 4,284,663 issued to J. R. Carruthers on Aug. 18, 1981 discloses the basic principles of this method.

An alternative waveguide forming technique is often referred to as the proton-exchange method. Here, the substrate is immersed in an acid bath causing the hydrogen ions present in the acid to exchange locations with the lithium atoms in the substrate material. This exchange of protons and lithium atoms will result in changing the refractive index of the substrate material. An article entitled "Proton exchange for high-index waveguides in LiNbO₃" by J. L. Jackel et al. appearing in *Applied Physics Letters*, Vol. 41, No. 7, October 1982, at p. 607–8 reports on one embodiment of this technique which utilizes benzoic acid as the proton source of choice. As described in the reference, benzoic acid was chosen for both its low proton donor strength and its ability to effect as much as a 50% replacement of the lithium in a surface layer several microns thick without inducing major structural damage to the substrate. Palmitic acid has also been successfully used as an exchange medium, as discussed in the article entitled "Independent Control of Index and Profiles in Proton-Exchanged Lithium Niobate Guides" by M. De Micheli et al. appearing in *Optics Letters*, Vol. 8, No. 2, 1983, at p. 114–5. Indeed, both acids have been found to yield a change in refractive index of $\Delta n_e = 0.12$. U.S. Pat. No. 4,547,262 issued to W. Spillman, Jr. et al. on Oct. 15, 1985 discusses a method of forming thin film waveguide structures using this conventional benzoic acid proton exchange method with lithium tantalate substrates (lithium niobate substrates being reported by Spillman, Jr. et al. as suffering from instability as related to proton mobility). Spillman, Jr. et al. also provides a discussion on the need to perform an anneal step after the exchange process in order to drive the protons sufficiently far into the substrate material so as to form light-guiding channels of a useful depth.

Although effective guiding structures may be formed using a benzoic acid source in the proton-exchange method, some problems exist with utilizing this acid in a manufacturing environment. Firstly, since benzoic acid is a rather weak acid, the proton exchange must be accomplished at an elevated temperature (over 200° C.) to achieve the desired change in the index of refraction. Since benzoic acid begins to sublime at approximately 120° C., it is difficult to control the exact benzoic composition during prolonged use (such as on a manufacturing line), at the required proton-exchange temperature of over 200° C. Thus it becomes difficult, if not impossible, to form waveguides of reproducible quality on the substrates as they are processed through the line. Further, the breakdown and eventual vaporization of the benzoic acid makes it highly dangerous and an unlikely candidate for use in a manufacturing facility where a large number of workers may be exposed to the vapors.

Thus, a need remains in the prior art for an alternative method of forming waveguides using the proton-exchange technique which is compatible with mass-production facilities.

SUMMARY OF THE INVENTION

The present invention addresses the need remaining in the prior art and relates to an alternative proton-exchange method of forming optical waveguides and, more particularly, to such a method which utilizes sulfuric acid as the proton donor source.

In accordance with the present invention, the optical substrate (lithium niobate, for example) is appropriately masked and lowered into a full strength sulfuric acid bath maintained at a constant temperature (150° C., for example). The substrate is immersed in the acid for a period of time sufficient to provide the requisite exchange of the hydrogen from the acid and the lithium from the substrate. Upon removal of the substrate from the acid, the substrate surface is rinsed with deionized water to remove any residual acid and the mask is removed. The substrate must then be annealed at an elevated temperature for a period of time sufficient to drive the protons to the depth required to form the optical waveguide.

An advantage of the utilization of the sulfuric acid proton-exchange technique of the present invention is that this acid has a liquid range from below room temperature to well above the temperature required for the exchange process. In contrast, the benzoic acid used in the prior art techniques begins to sublime at 120° C., and is thus dangerous to use at the elevated temperatures (perhaps greater than 200° C.) required for the proton exchange process. Another advantage with the utilization of sulfuric acid is that the exchange process may require a shorter period of time than a similar process using benzoic acid. This is due to the fact that sulfuric acid is a much stronger acid than benzoic acid.

Other and further advantages of the present invention will become apparent during the course of the following discussion and by reference to the accompanying drawings.

BRIEF DESCRIPTION OF THE DRAWING

Referring now to the drawings.

DETAILED DESCRIPTION

The following discussion of the inventive technique describes waveguide formation on a lithium niobate ($LiNbO_3$) substrate. However, it is to be noted that the inventive proton-exchange technique utilizing sulfuric acid ($H_2SO_4$) as the proton donor is also capable of forming waveguides on a lithium tantalate ($LiTaO_3$) substrate, or any other similar material of the form $LiXO_3$. The inventive technique merely relies on the ability of the lithium present in the substrate to exchange location with the hydrogen in the sulfuric acid.

Figure 1:
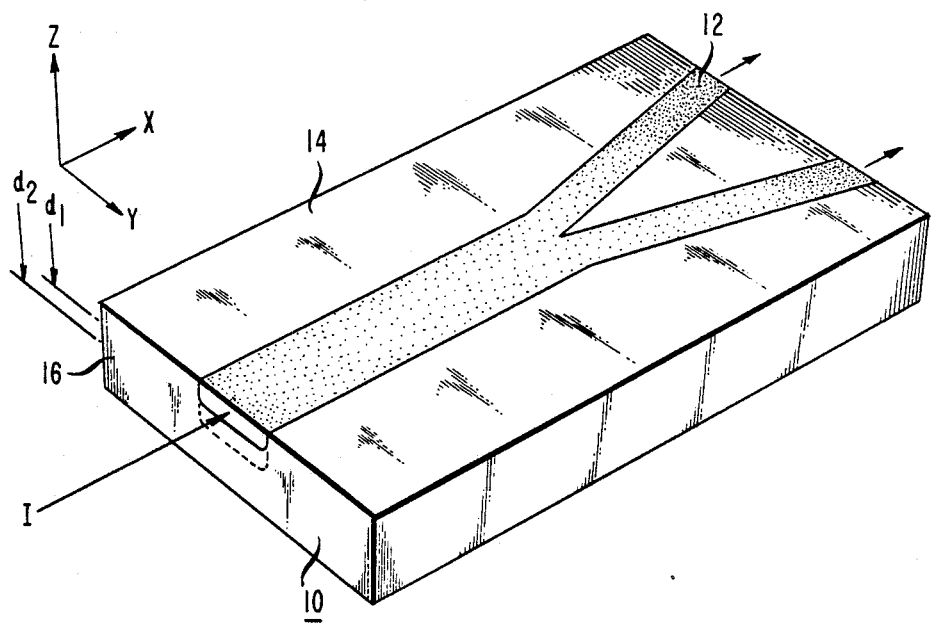
FIG. 1 illustrates an exemplary Z-cut lithium niobate substrate containing a proton-exchanged waveguide formed in accordance with the present invention.

Referring now to FIG. 1, an exemplary lithium niobate substrate 10 is illustrated in perspective, where substrate 10 is provided by cleaving a slab of lithium niobate in the Z-direction, as indicated in the figure. Z-cut lithium niobate is commonly used for the fabrication of proton-exchanged waveguide structures, since Y-cut substrates have been reported to show considerable damage upon exposure to any type of acid. With the structure as illustrated in FIG. 1., a waveguide 12, here illustrated as a splitter/coupler, is formed by covering the remainder of top surface 14 of substrate 10 with a masking material impervious to sulfuric acid. Silicon dioxide, deposited by a conventional low temperature CVD technique, is one exemplary substance which may be used for this purpose. Waveguide 12 is formed along the X-direction of the substrate. The proton exchange process of the present invention results in increasing the extraordinary refractive index $\Delta n_e$ in the unmasked (waveguide) region. The ordinary index of refraction is not greatly affected. It is this change in the extraordinary refractive index that allows any light I entering front endface 16 of substrate 10 to propagate along waveguide 12. For example, a $\Delta n_e = 0.10$ will allow waveguide 12 to support light propagating in the TM mode.

Subsequent to the masking operation, substrate 10 is immersed in a bath of full strength sulfuric acid, where the acid is maintained at a temperature of, for example, 150° C. It is to be noted that the proton-exchange process of the present invention may utilize a sulfuric acid bath maintained at a temperature anywhere in the range of, for example, 110° C. to 210° C., where only the immersion time, T, must be altered as a function of temperature to obtain the same exchange depth. As will be described in detail below, the substrate is left in the sulfuric acid bath for a length of time (T) sufficient to provide an adequate exchange of protons and lithium atoms. Additionally, both the immersion time T and sulfuric acid bath temperature t determine the depth $d_1$ (see FIG. 1) which the exchange will reach beneath surface 14 of substrate 10.

Figure 2:
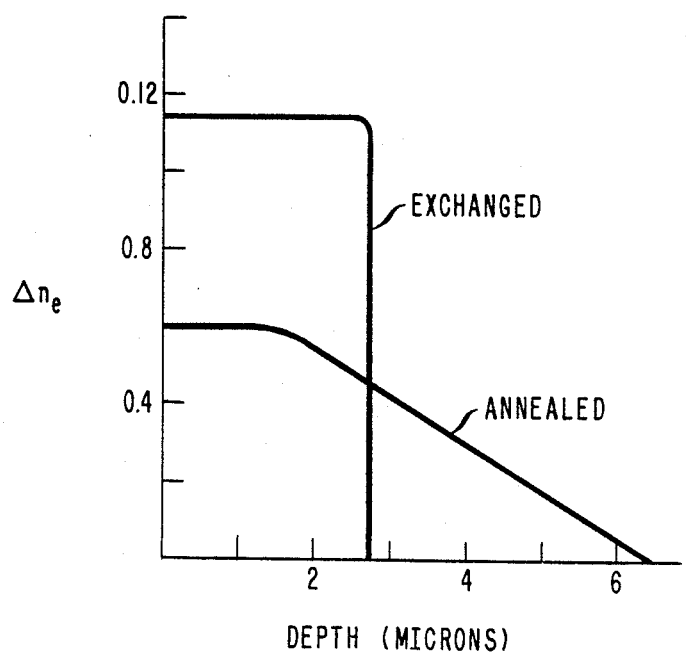
FIG. 2 is a graph illustrating the refractive index profiles, as a function of depth, for an exemplary proton-exchanged waveguide formed in accordance with the present invention, one profile (labeled "E") reflecting the refractive index after the proton exchange and another profile (labeled "A") reflecting the refractive index subsequent to the anneal.

At the end of the proton exchange process, the as-formed waveguide will exhibit a step-shaped refractive index profile, as shown by the curve labeled "Exchanged" in FIG. 2. For the example illustrated in FIG. 2, a change in the extraordinary refractive index, $\Delta n_e$, of approximately 0.10 is exhibited in the waveguide region from top surface 14 of substrate 10 to a depth $d_1$ of approximately 2.5 microns. Since this depth (or any depth which may be reached with the proton exchange process) is not sufficient to allow the coupling and propagation of an input light signal, substrate 10 must be annealed at an elevated temperature for a period of time sufficient to drive the protons to an adequate depth. For example, an anneal in an air ambient at 360° C. for 4–5 hours has been found to provide a sufficient proton migration, resulting in the gradient-shaped refractive index profile, labeled "Annealed", as shown in FIG. 2. The particular anneal process utilized to provide this movement, as seen by reference to FIG. 2, results in migrating a portion of the proton population to a depth $d_2$ of approximately 6 microns into the lithium niobate substrate. The "Anneal" profile also indicates a decrease in the refractive index change at the surface of the substrate, dropping from a $\Delta n_e$ of 0.10 after exchange to a $\Delta n_e$ of 0.06 after anneal. This latter value has been found to be sufficient to providing adequate guiding of the TM mode through the proton-exchange waveguide.

Figure 3:
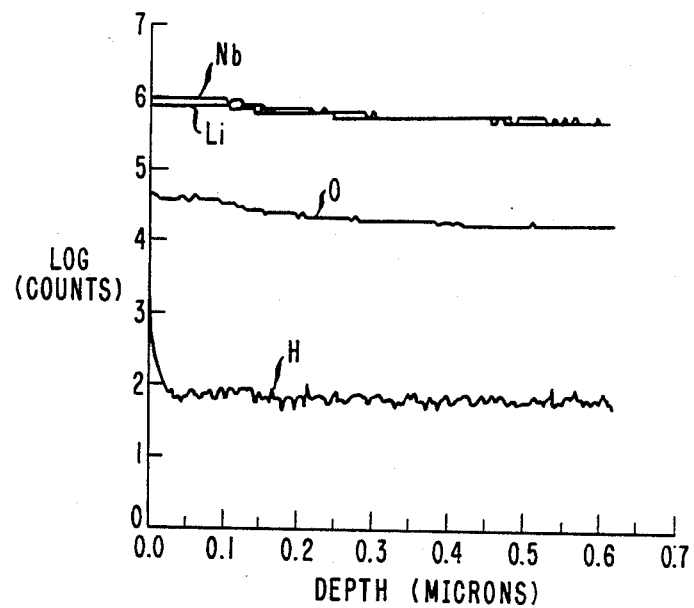
FIG. 3 illustrates the Secondary Ion Mass Spectrometry (SIMS) measurements on an untreated lithium niobate substrate.
Figure 4:
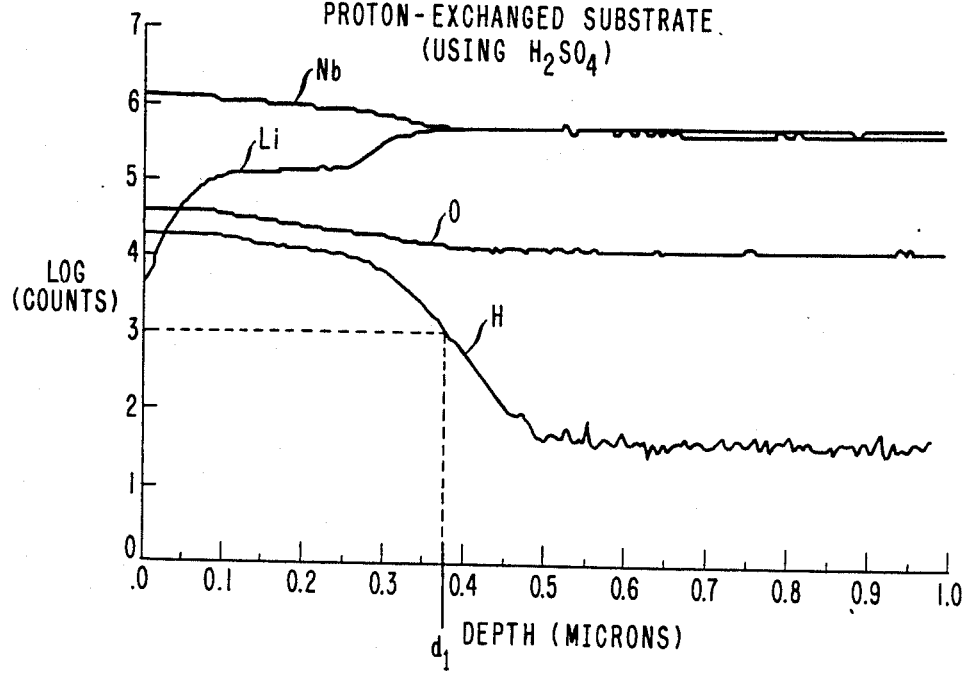
FIG. 4 illustrates the SIMS measurements on the lithium niobate substrate subsequent to the proton exchange process of the present invention.
Figure 5:
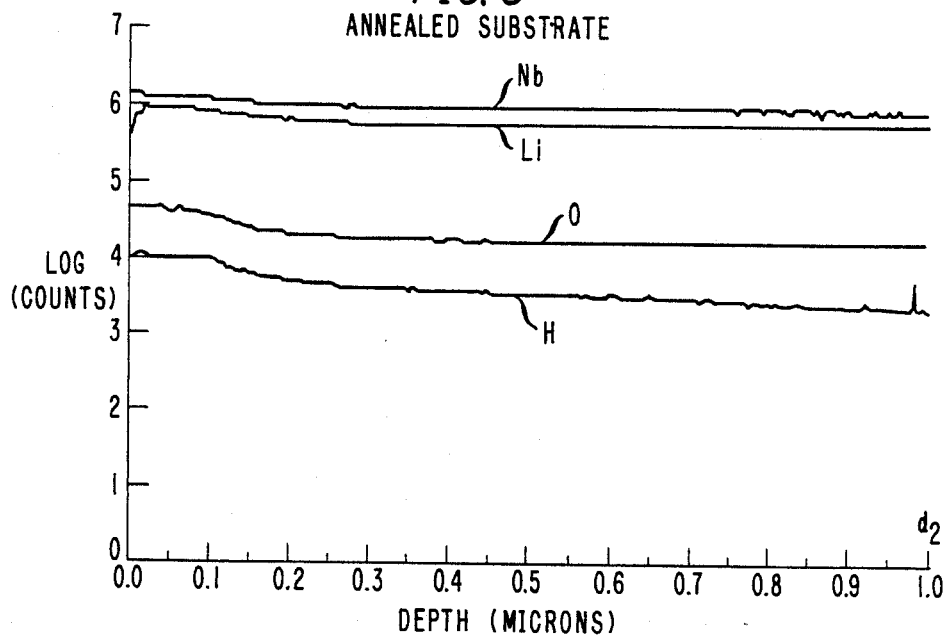
FIG. 5 illustrates the SIMS measurements on the lithium niobate substrate subsequent to the anneal process of the present invention.

The alteration of the lithium niobate substrate during the process of forming the proton-exchanged waveguide can be seen by comparing FIGS. 3–5. FIG. 3 illustrates secondary-ion mass spectrometry (SIMS) measurements for an exemplary untreated substrate of lithium niobate prior to immersion in the sulfuric acid bath. A SIMS profile, as is well-known in the art, characterizes the various elements forming the subject material, providing a count of each element's concentration (defined as counts/scanned unit area) as a function of depth into the material. Referring to FIG. 3, it is seen that the untreated lithium niobate comprises essentially identical amounts of lithium and niobium ($1 \times 10^6$ counts/area), throughout the entire depth of the substrate. Oxygen is likewise uniformly present, although at a lesser quantity (approximately $8 \times 10^4$ counts/area). A slight amount of hydrogen (approximately 100 counts/area) is also present at the top of the substrate, due to water and other hydrogen-containing contaminants which may be present on the surface. The sulfuric acid proton exchange process of the present invention, as illustrated by FIG. 4, introduces a substantial amount of hydrogen into the surface of the substrate, from a level of approximately $5 \times 10^4$ counts/area at top surface 14, to a level of $1 \times 10^3$ counts/area at a depth $d_1$ of approximately 0.35 microns. This particular SIMS profile is the result of analyzing a proton-exchanged waveguide formed by immersing the masked substrate into a 144° C. bath of sulfuric acid for several hours (immersions may be for any time period from 30 minutes to over 15 hours). As also seen by reference to FIG. 4, the lithium population exhibits a significant decrease (of approximately two orders of magnitude) within the portion of the substrate that experienced the exchange with the hydrogen. FIG. 5 illustrates the same substrate, subsequent to an anneal at a temperature of 360° C. for approximately 4–5 hours. As shown, the hydrogen has migrated further into the lithium niobate substrate, resulting in a relatively uniform distribution from the surface to a depth $d_2$ of at least 1.0 micron. This anneal process also causes the lithium present below the exchange layer to migrate upwards, providing a lithium population near the surface substantially equal to that present prior to the exchange process (see FIG. 3). This return of lithium to the surface is seen as ensuring that the annealed lithium niobate structure is relatively stable and impervious to further change.

Figure 6:
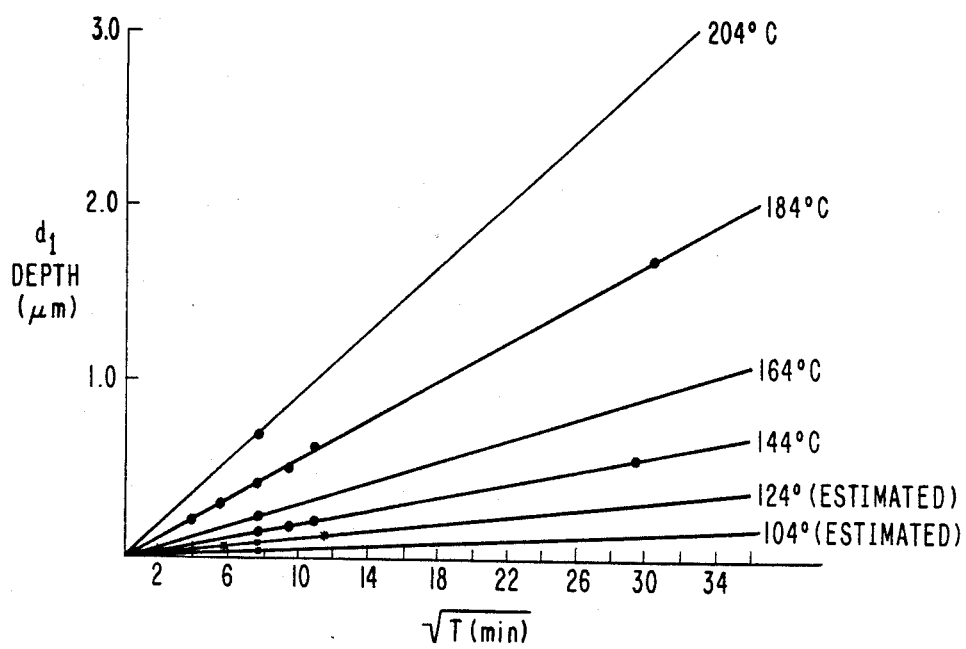
FIG. 6 is a graph of the exchange layer thickness as a function of the square root of the exchange time, for various sulfuric acid bath temperatures, ranging from 104° C. to 204° C.

As mentioned above, both the temperature, t, of the sulfuric acid bath and the immersion time, T, of the substrate, affect the depth to which the exchange process occurs within the substrate. FIG. 6 illustrates this relationship by plotting the exchange depth $d_1$ as a function of the square root of temperature T, for various temperatures ranging from t=104° C. to t=204° C. As can be seen by studying FIG. 6, there is a distinct linear relationship between $\sqrt{T}$ and $d_1$, with the exchange depth increasing as the immersion time is increased. Additionally, as the temperature is increased, it is seen that the exchange depth is likewise increased, in other words, the slope of the proton-exchange depth rate line increases with increasing temperature. For example, an exchange process carried out at 164° C. for a time of approximately one hour yields an exchange depth of approximately 0.22 microns. Increasing the sulfuric acid bath temperature to 184° C. while keeping the immersion time at one hour results in an exchange depth of 0.41 microns, a two-fold increase in depth.

It is to be understood that the results illustrated in the graph of FIG. 6 are illustrative only, and various other results may be achieved utilizing the sulfuric acid proton-exchange process of the present invention. In particular, various other sulfuric acid bath temperatures, immersion times, anneal temperatures and anneal times may be used to achieve a change in refractive index $\Delta n_e$ sufficient to achieve guiding in the substrate material.

What is claimed is:

1. A method of forming optical waveguides comprising the steps of:
   (a) providing an optical substrate of the composition $LiNbO_3$ or $LiTaO_3$, said substrate being defined as having a top major surface for forming optical waveguides therein;
   (b) masking the top major surface of the substrate provided in step (a) such that the unmasked areas delineate the regions of desired optical waveguiding;
   (c) immersing the masked substrate of step (b) in a full strength sulfuric acid bath of a predetermined temperature t sufficient to provide for exchange between protons in the sulfuric acid and lithium in the optical substrate;
   (d) removing the exchanged substrate from the bath after a predetermined period of time T sufficient to provide an exchange to a predetermined depth $d_1$ into said substrate from said top major surface;
   (e) removing the mask from said top major surface; and
   (f) heating said exchanged substrate at an elevated temperature and for a period of time sufficient to effect a migration of the exchanged protons to a annealed depth $d_2$ greater than the exchanged depth $d_1$, said annealed depth determined to be sufficient to provide optical waveguiding.

2. The method of claim 1 wherein in performing step (c), the sulfuric acid bath is maintained at a constant temperature within the range of approximately 110° C. to approximately 210° C.

3. The method of claim 1 wherein in performing step (d), the predetermined time period is within the range of 30 minutes to 8 hours.

4. The method of claim 1 wherein in performing step (f), the exchanged substrate is heated to a temperature within the range of 300°–400° C. for a period of time in the range of 4–5 hours.

5. The method of claim 1 wherein in performing step (a), the optical substrate is provided from a 2-cut crystal.

6. The method of claim 1 wherein in performing step (a), a substrate of $LiNbO_3$ is provided.

* * * * *